2,782,183

POLYMER SEPARATION METHOD FOR CALCIUM POLYACRYLATES

Reginald N. González, Holyoke, Mass., assignor to Monsanto Chemical Company, St. Louis, Mo., a corporation of Delaware No Drawing. Application August 8, 1952,
Serial No. 303,410

8 Claims. (Cl. 260—88.7)

This invention relates to new polymeric compounds and more specifically to a method of separating the calcium salts of hydrolyzed acrylonitrile polymers from water slurries thereof.

In copending application, Serial No. 303,395, filed on August 8, 1952, by Costas H. Basdekis, there are described and claimed new partially water-soluble polymers and methods for their preparation by the incomplete hydrolysis of acrylonitrile polymers at elevated temperatures in aqueous slurries with calcium hydroxide. In accordance with this method the useful polymers may be prepared by using a predetermined quantity of hydrolysis agent, less than the stoichiometric proportion, or alternatively by interrupting the reaction when from 64 to 76 percent of the original cyano nitrogen has been converted to ammonia or when, in the case of polyacrylonitrile, the product contains from 3.5 to 5.5 percent nitrogen by weight. Preferred practice involves interrupting the reaction after from 66 to 74 percent of the original cyano nitrogen has been hydrolyzed or when, in the hydrolysis of polyacrylonitrile, the product contains from four to five percent nitrogen.

The slurry resulting from the reaction contains the product in particulate form, but is very difficult to separate the product from the aqueous medium. Attempted filtrations by conventional methods will produce viscous gels containing a large proportion of water, which can be removed only by direct drying. The separation of water from this gel is costly and time consuming, since the heat transfer rate to the solid mass is very low. Furthermore, the drying of the gel produces a very hard resin, which must be ground to a finely divided state before it can be used effectively in most of its many applications.

If the partial calcium salts of the hydrolyzed acrylonitrile polymers are prepared by other methods, for example by the precipitation of aqueous solutions of the analogous polymeric sodium salt, a similar non-filterable slurry is obtained. This slurry resembles the hydrolysis reaction product in that it normally settles to form a viscous gel which cannot be redispersed.

The primary purpose of this invention is to provide a convenient method of separating a partial calcium salt of a hydrolyzed acrylonitrile polymer from an aqueous slurry thereof. A still further purpose of this invention is to prepare a pulverulent solid calcium salt of partially hydrolyzed acrylonitrile polymers by direct filtration of an aqueous slurry containing the polymer. A further purpose of this invention is to adapt the lime hydrolysis of acrylonitrile polymers to industrial practicability.

It has now been found that the partially hydrolyzed polymer of acrylonitrile can be filtered, if the slurry and the polymer separated therefrom are maintained at all times at temperatures in excess of 75° C. Since between 75° C. and 85° C. an incipient gelation may sometimes be observed, especially if the period of contact between polymer and water is prolonged, temperatures in excess of 85° C. are preferred. The polymers may be recovered directly in a dry pulverulent form by drying the filtered polymer while maintaining the temperature above 75° C., or above 85° C. in the preferred practice. Separation effected in accordance with conditions involving prolonged contact and/or the lower part of the specified temperature range may produce a slightly gelled polymer which, although readily filterable, cakes slightly during the final drying operation. The latter type of solid polymers may be readily reduced to finely divided state by a mild mechanical action.

By the expression "polymers of acrylonitrile," as used in this specification and its appened claims, both self-polymers and copolymers are contemplated. Polyacrylonitrile is preferred and may be used in any solid form, a finely divided powder, discreet bead form, fibrous synthetic acrylic fiber scraps, or even more massive structures. Copolymers of acrylonitrile with one or more other monomers, for example, vinyl chloride, styrene, vinyl acetate, and any other monomer copolymerizable therewith, and especially the copolymers of 75 or more percent by weight of acrylonitrile and up to 25 percent of one or more comonomers, may also be used in any solid form. Irrespective of the chemical or physical nature of the acrylonitrile polymer upon hydrolysis, the cyano radicals are converted to carboxy groups, possibly passing through an intermediate amide form, and are converted to the calcium salt, either simultaneously or by a separate operation.

The hot filtration of the slurry may be practiced in any filtering apparatus provided with a steam jacket or other heating means adapted to maintain the filtering mixture at a temperature of above 75° C. and preferably at temperatures close to the boiling point of the slurry. The filter should be adapted to be quickly discharged into a vacuum pan dryer or other conventional drying apparatus which is heated from an external source so as to maintain the elevated temperature until substantially all of the water has been removed.

Further details of the practice of this invention are set forth with respect to the following specific example:

*Example*

Polyacrylonitrile was suspended in water and charged with 75 percent of the stoichiometric proportion of calcium oxide. The mixture was refluxed for 20 hours during which time the polymer changed from white to brown and back to white again. A slurry of fine particles suspended in water was obtained. The aqueous suspension was passed through a hot Büchner filter under conditions such that the slurry and filter cake were maintained at temperatures above 85° C. The filter cake was rapidly transferred to a preheated (120° C.) pan dryer and after five hours a 27-inch vacuum was applied and maintained for four additional hours. A dry free-flowing polymer was recovered.

A similar separation was attempted without maintaining a temperature above 75° C. The polymer mass soon became gelatinous and no further separation of water was possible.

In another separation experiment the moist polymer from the filter was passed into a pan dryer and the vacuum was applied immediately. The adiabatic cooling reduced the temperature below 75° C. and the wet polymer congealed to a water-impervious mass.

The expression, "water-soluble," as used throughout the specification is intended in the broad sense, and includes non-Newtonian solutions as well as the so-called "true solutions." Thus, the water-soluble polymers will include those which can be swollen by water to an infinite extent, and these are considered completely water-soluble. Other polymers which are swollen by water to a substantial but limited extent are termed "partially water-soluble." The solubility is evidenced by this capacity of the polymer-water composition for aggregating soil, since the ability to adsorb on the soil and manifest a substantial increase in the proportion of water-stable aggregates therein, depends upon the hydrophilic molecular dispersibility of the polymer in the soil water, whereby polymeric ions are formed. This solubility is regarded as necessary for the diffusion of the polymer mass through the soil moisture to attain optimum soil aggregation.

What I claimed is:

1. A method of preparing a solid pulverulent calcium salt of a hydrolyzed acrylonitrile polymer having from 66 to 74 percent of the original cyano nitrogen content converted to and evolved as ammonia, which comprises precipitating the said calcium salt at a temperature above 75° C. to form a suspension in a medium substantially entirely comprised of water, filtering the resulting suspension while maintaining the temperature above 75° C., and drying the precipitate at a temperature above 75° C.

2. A method of preparing a solid pulverulent calcium salt of a hydrolyzed acrylonitrile polymer having from 66 to 74 percent of the original cyano nitrogen content converted to and evolved as ammonia, which comprises precipitating the said calcium salt at a temperature above 85° C. to form a suspension in a medium substantially entirely comprised of water, filtering the resulting suspension while maintaining the temperature above 85° C., and drying the precipitate at a temperature above 85° C.

3. A method of separating from a suspension in an aqueous medium substantially entirely comprised of water, a solid pulverulent calcium salt of a hydrolyzed acrylonitrile polymer having from 66 to 74 percent of the original cyano nitrogen content converted to and evolved as ammonia, said calcium salt having been prepared in suspension at a temperature above 75° C., which comprises filtering the suspension and drying the separated solids while maintaining the temperature at all times in excess of 75° C.

4. A method of separating from a suspension in an aqueous medium substantially entirely comprised of water, a solid pulverulent calcium salt of a hydrolyzed acrylonitrile polymer having from 66 to 74 percent of the original cyano nitrogen content converted to and evolved as ammonia, said calcium salt having been prepared in suspension at a temperature above 85° C., which comprises filtering the suspension and drying the separated solids while maintaining the temperature at all times in excess of 85° C.

5. A method of preparing a solid pulverulent calcium salt of a hydrolyzed polyacrylonitrile having from 66 to 74 percent of the original cyano nitrogen content converted to and evolved as ammonia, which comprises precipitating the said calcium salt at a temperature above 75° C. to form a suspension in a medium substantially entirely comprised of water, filtering the resulting suspension while maintaining the temperature above 75° C., and drying the precipitate at a temperature above 75° C.

6. A method of preparing a solid pulverulent calcium salt of a hydrolyzed polyacrylonitrile having from 66 to 74 percent of the original cyano nitrogen content converted to and evolved as ammonia, which comprises precipitating the said calcium salt at a temperature above 85° C. to form a suspension in a medium substantially entirely comprised of water, filtering the resulting suspension while maintaining the temperature above 85° C., and drying the precipitate at a temperature above 85° C.

7. A method of separating from a suspension in an aqueous medium substantially entirely comprised of water, a solid pulverulent calcium salt of a hydrolyzed polyacrylonitrile having from 66 to 74 percent of the original cyano nitrogen content converted to and evolved as ammonia, said calcium salt having been prepared in suspension at a temperature above 75° C., which comprises filtering the suspension and drying the separated solids while maintaining the temperature at all times in excess of 75° C.

8. A method of separating from a suspension in an aqueous medium substantially entirely comprised of water, a solid pulverulent calcium salt of a hydrolyzed polyacrylonitrile having from 66 to 74 percent of the original cyano nitrogen content converted to and evolved as ammonia, said calcium salt having been prepared in suspension at a temperature above 85° C., which comprises filtering the suspension and drying the separated solids while maintaining the temperature at all times in excess of 85° C.

References Cited in the file of this patent

UNITED STATES PATENTS

| | | |
|---|---|---|
| 1,984,417 | Mark et al. | Dec. 18, 1934 |
| 2,625,529 | Hedrick et al. | Jan. 13, 1953 |

OTHER REFERENCES

Partington: "A Textbook of Inorganic Chemistry," McMillan and Co. (London), 1950, 6th ed., page 7. (Copy in Sci. Lib.)

Caspari, Jr.: "A Treatise on Pharmacy," Lea and Febriger (N. Y.), vol. 7, 1926, page 157.